Dec. 7, 1965    A. A. D'ARRIGO    3,221,640
VEGETABLE BUNCHING MACHINE
Filed March 12, 1964    7 Sheets-Sheet 1

FIG-1

INVENTOR.
ANDREW A. D'ARRIGO
BY *Edward B. Gregg*

ATTORNEY

INVENTOR.
ANDREW A. D'ARRIGO
BY Edward B. Gregg

ATTORNEY

Dec. 7, 1965 A. A. D'ARRIGO 3,221,640
VEGETABLE BUNCHING MACHINE
Filed March 12, 1964 7 Sheets-Sheet 6

INVENTOR.
ANDREW A. D'ARRIGO
BY Edward B. Gregg
ATTORNEY

Dec. 7, 1965     A. A. D'ARRIGO     3,221,640
VEGETABLE BUNCHING MACHINE
Filed March 12, 1964     7 Sheets-Sheet 7

INVENTOR.
ANDREW A. D'ARRIGO
BY Edward B. Gregg
ATTORNEY

United States Patent Office 3,221,640
Patented Dec. 7, 1965

3,221,640
VEGETABLE BUNCHING MACHINE
Andrew A. D'Arrigo, Salinas, Calif., assignor to D'Arrigo Bros. Co. of California, Salinas, Calif., a corporation of California
Filed Mar. 12, 1964, Ser. No. 351,406
15 Claims. (Cl. 100—5)

This invention relates to a vegetable bunching apparatus and more particularly to an apparatus for bundling elongate articles including means for transferring a tie band from a source of supply thereof to a position in a trough where a plurality of articles may be gripped in preparation for tying.

In marketing of fresh vegetables such as broccoli, asparagus and the like, in which an edible portion includes stalks or shoots, it is common practice to tie a plurality of such stalks or shoots together in a bunch. To facilitate such packing, as well as subsequent handling and shipping, the bunches are preferably trimmed to substantially uniform length. A bunching and trimming apparatus for such use is shown in a copending patent application of Riccardo Verrado entitled "Broccoli Bunching and Trimming Apparatus" Serial No. 302,948 filed August 19, 1963 and assigned to the same assignees as this invention. With the machine of the copending application however, the ties are manually placed in the trough prior to placing the stalks thereon. Such a manual transfer of the ties is eliminated with the apparatus of this invention.

An object of this invention is the provision of an improved semi-automatic article bunching, tying and trimming machine.

An object of this invention is the provision of an apparatus for bunching together stalks or shoots of vegetables, which apparatus includes means for automatically transferring a skirt-type tie from a supply thereof into position in preparation for tying the stalks into a bunch.

An object of this invention is the provision of an improved semi-automatic vegetable bunching and trimming machine by means of which an operator may easily and readily bunch, trim and tie together stalks or shoots of broccoli or the like.

An object of this invention is the provision of a broccoli bunching machine in which skirt-type ties carried in a magazine are automatically transferred one at a time to a trough prior to the placing of a bunch of stalks of broccoli in the trough by the operator.

These and other objects and advantages are obtained by means of a machine of the type which includes a movable trough which operates between a bunch supporting position and bunch release position. A magazine for holding a supply of skirt-type ties or the like is located adjacent the trough, and a vacuum transfer mechanism travels between a pick-up station at the magazine and a utilization station at the trough for automatic transfer of the ties from the magazine to the trough. With the trough in the bunch supporting position and with a tie located across the trough, the operator places a plurality of stalks of vegetables thereon. A power operated gripper member and a power operated knife are simultaneously operated upon actuation of a control valve by the operator to clamp the stalks together in a bunch on the trough and to trim the ends of the stalks. The operator twists the tie ends together to contain the stalks in a bunch and then releases the control valve. Upon release thereof the gripper member and knife return to a normal position, the trough is moved to a bunch release position whereupon the bunched vegetables are ejected from the trough, and the vacuum transfer mechanism automatically functions to transfer a tie from the magazine to the trough in preparation for another cycle of operation.

In the drawings wherein like reference characters refer to the same parts in the several views.

Reference is now made to FIGURES 1 through 4 of the drawings wherein there is shown a bunching and trimming apparatus designated generally by the reference numeral 10, which apparatus is constructed in accordance with this invention. Although the apparatus will be described for use for broccoli, it will be understood that it is not so limited and may be used in the bunching and trimming of other vegetables such as asparagus and the like and even other similarly elongated articles. The apparatus includes a frame 11 comprising vertical legs 12 interconnected by horizontal front members 13 and 13a and rear members 14 and 14a near the lower and at the upper ends of the legs, respectively. Horizontal side members 16 and 16a interconnect the right hand front and rear legs as viewed in FIGURE 1, while a single horizontal side member 17 interconnects the left hand front and rear legs. A horizontal brace 18 extends between the horizontal front and rear members 13 and 14 intermediate the ends thereof, and supports a vertical upright member 19 which extends to the top of the horizontal frame members 13a, 14a and 16a. A brace 21 between the front member 13a and upright member 19 provides added rigidity thereto, and serves as a mounting support for the pivotal knife as described hereinbelow. A second member 22 extends from the brace 18 upwardly and to the left as viewed in FIGURES 1 and 4, and braces 23 and 24 extend from the upper end of the inclined brace 22 to the upper end of the upright member 19 and to the horizontal rear member 14a, respectively. The frame members may be welded riveted, bolted or otherwise secured together by any suitable means not shown.

Figure 1:
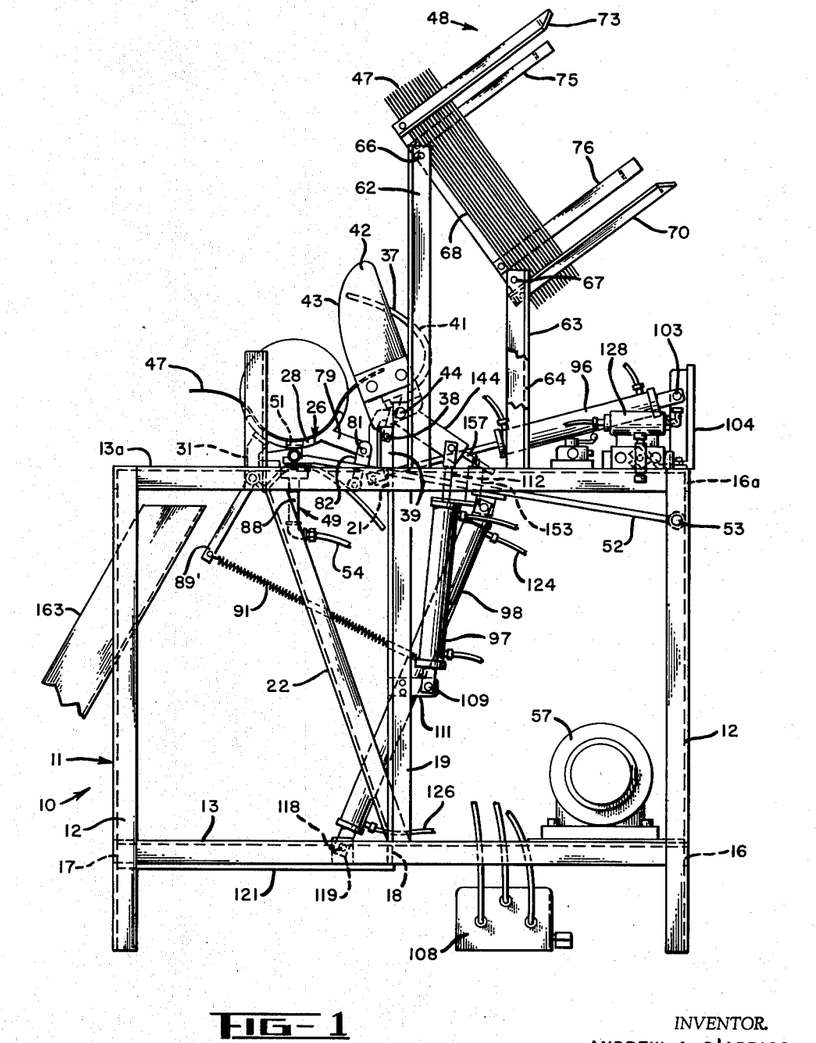
FIGURE 1 is a front elevational view of a vegetable bunching and trimming machine embodying this invention.
Figure 2:
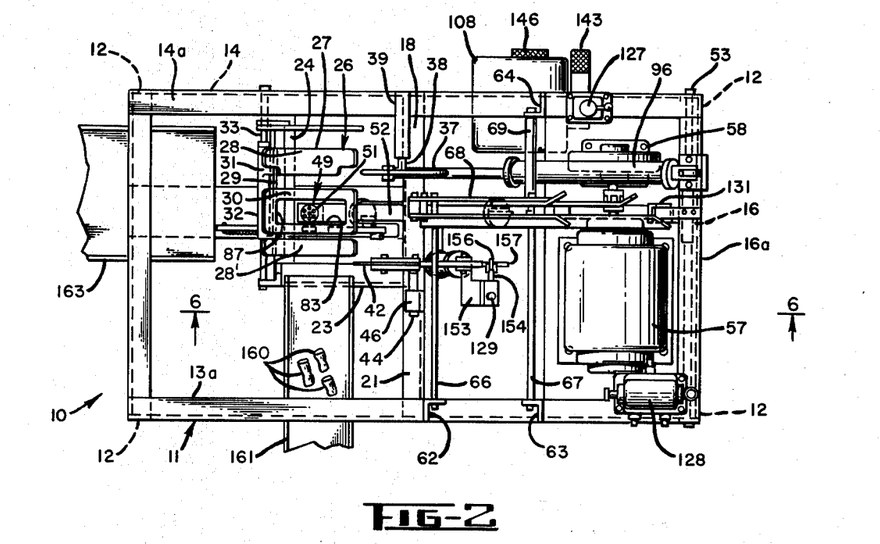
FIGURE 2 is a top plan view of the machine shown in FIGURE 1.
Figure 3:
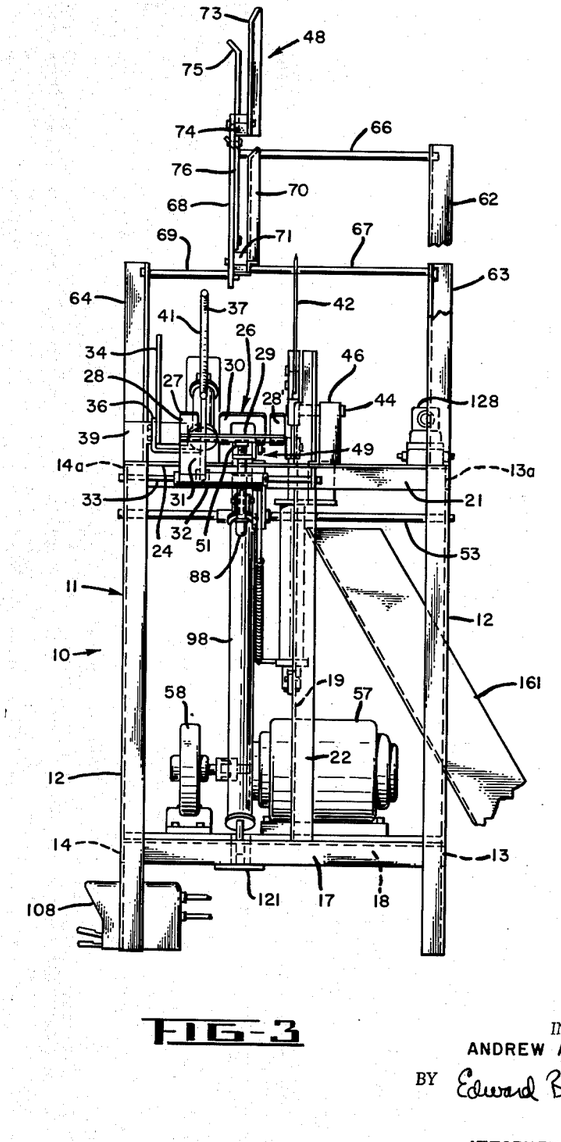
FIGURE 3 is an end elevational view of the machine as viewed from the left in FIGURE 1, but showing the machine in a different operating condition.
Figure 4:
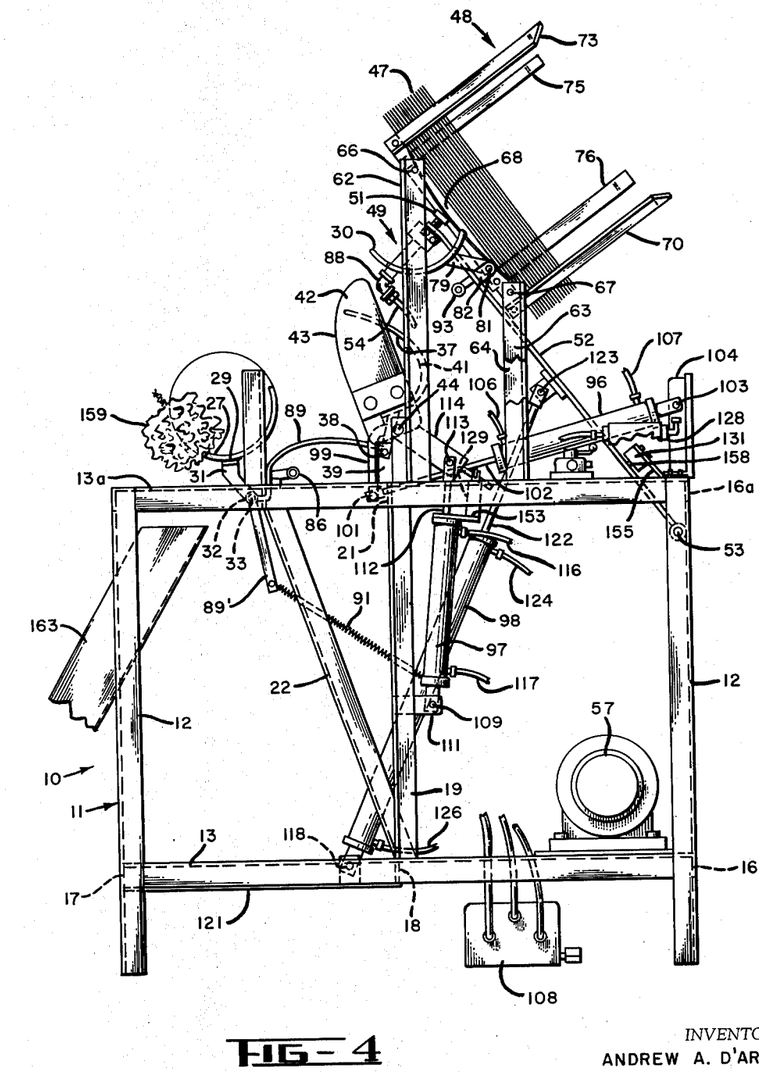
FIGURE 4 is similar to FIGURE 1, but showing the machine in the operating condition illustrated in FIGURE 3.

The broccoli is adapted to be supported in a trough designated generally by the reference numeral 26. The trough is formed in two sections each of which is individually pivotally movable about its own pivot axis. The one trough section 27, as best seen in FIGURES 2 and 3, comprises a pair of spaced arcuate members 28 and 28' interconnected by a member 29 extending therebetween. The other pivotally mounted trough section comprises an arcuate member 30 which is positioned between the sections 28 and 28' in the normal vegetable supporting or loading condition of the machine. The one trough section 27 is described as a dumping section while the other trough section 30 is described as a tie delivery section, for reasons which will become apparent hereinbelow. The arcuate dumping and tie delivery sections have substantially identical curvatures and, in the vegetable loading condition illustrated in FIGURES 1-3, the longitudinal axes of said trough sections lie in a substantially straight line. Thus, the supporting surfaces of the trough sections 27 and 30 are adapted to lie in a continuous concave surface for support of elongated articles thereon. An arm 31 as best seen in FIGURES 1 and 4 interconnects the connecting member 29 with a sleeve 32 which is pivotally mounted on a pivot pin 33 extending between the brace 23 and rear member 14a. The trough dumping section 27 is, therefore, adapted for pivotal movement about the axis of the pin 33; the trough being shown in a normal bunch supporting position in FIGURES 1 through 3 and 6, and in a bunch release or dumping position in FIGURE 4. The mounting for the trough tie delivery section 30 is described in detail hereinbelow in connection with the description of the vacuum transfer mechanism. A vertical face plate 34 is attached at one end of said trough dumping section 27 by means of a bracket 36 at the rear of the trough, against which face plate the head or tip ends of the vegetable stalks may be butted to provide for uniform length stalks in the bunched and trimmed packs of vegetables.

In the operation of the machine described in detail hereinbelow the stalks of vegetables such as broccoli stalks are gripped peripherally and bunched together in the trough 26 by means of a gripper member 37. The gripper member is fixed to a shaft 38 which in turn is pivotally supported in an inverted L-shaped bearing block 39 secured to the frame member 14a, with the axis of the shaft 38 extending parallel to the pivot pin 33 for the trough dumping section 27. The gripper member is shown comprising a rod bent into an arcuate configuration as shown, the rod preferably being covered with a length of resilient tubing 41 to prevent bruising of the vegetables in the vegetable gripping position thereof. The gripper member together with the trough comprise an article holding means for firmly embracing the articles placed on the trough.

The machine includes a knife 42 having a convex sharpened edge 43 for trimming the ends of the bunched vegetable stalks held in the trough by the gripper member. The knife is pivotally mounted on a pin 44 fixed to a bracket 46 extending upwardly from the brace 24. The knife is pivotal between the normal retracted position shown in FIGURES 1 through 4 and the vegetable trimming position shown in FIGURE 6.

As described in detail hereinbelow the vegetable stalks which are gripped in the trough 26 are tied together into a bunch by use of bands, or skirt-type ties 47, a supply of which is maintained in a magazine designated generally by the reference character 48. A novel vacuum mechanism designated generally by the reference character 49, and adapted for movement between a tie pick-up station at the magazine and a tie utilization station at the trough is employed to transfer the ties between said stations from the magazine to the trough where they may be used for tying the bunches together. The vacuum transfer mechanism includes a vacuum head 51 carried adjacent one end of an elongated pick-up head support arm 52, which arm is pivotally mounted at the other end thereof on a pin 53 extending between the legs 12 at the right of the machine as viewed in FIGURES 1 and 4. The vacuum head 51 is connected through a line 54 to any suitable vacuum source. In the drawings, the vacuum source is shown comprising a vacuum pump 58 driven by a motor 57 both of which are mounted on a platform extending between the frame members 13 and 14. Obviously, any other suitable vacuum source may be employed if desired, for supplying the vacuum head 51.

Figure 7:
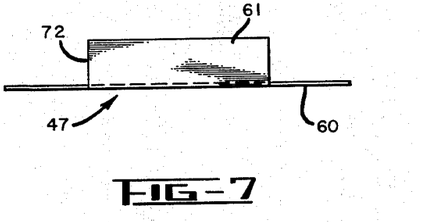
FIGURE 7 is a top plan view of a skirt-type tie of the type which may be employed in the machine of this invention.

Bands, or ties, of any suitable type may be used to wrap the bunches of vegetables together. As best seen in FIGURE 7 suitable ties 47 may be of the skirt-type which comprise a wire 60 with a wrapper 61 attached thereto. In the illustrated tie, the wire extends along one longitudinal edge of the skirt. The skirt has a surface of adequate size for suction engagement by the vacuum head to enable the lowermost tie to be withdrawn from the magazine 48. The magazine is supported on three leg members 62, 63 and 64, two of which extend upwardly from the frame member 13a and one of which extends upwardly from the frame member 14a. Tie supporting rods 66 and 67 extend inwardly from the legs 62 and 63, and an inclined brace 68 interconnects the rear ends of the rods. Additional support for the brace 68 and attached rods is provided by the bracket 69 extending between the said brace and the upright leg 64. An inclined base member 70 comprising an angle member is secured to the brace 68 through a block 71 and extends upwardly and to the right as viewed in FIGURES 1 and 4. The lower end edge 72 of the skirt of the ties (see FIGURE 7) rests upon the base member, and the ties are stacked with the lowermost tie abutting the rods 66 and 67 adjacent the opposite ends of the skirt. An upper guide member 73 is connected through a block 74 to the brace 68 and extends parallel to the base 70. Side guides 75 and 76 which are secured to the brace 68 extend parallel to the guide 73 and brace 70 a spaced distance to the rear thereof. The upper extended ends of the tie wires 60 pass between the guides 73 and 75 while the lower extended ends thereof pass between the base 70 and guide 76. The ties are sufficiently flexible to permit their being bent during withdrawal from the magazine between the rod 66 and 67 by the vacuum head 51, as illustrated in FIGURE 4.

Figure 6:
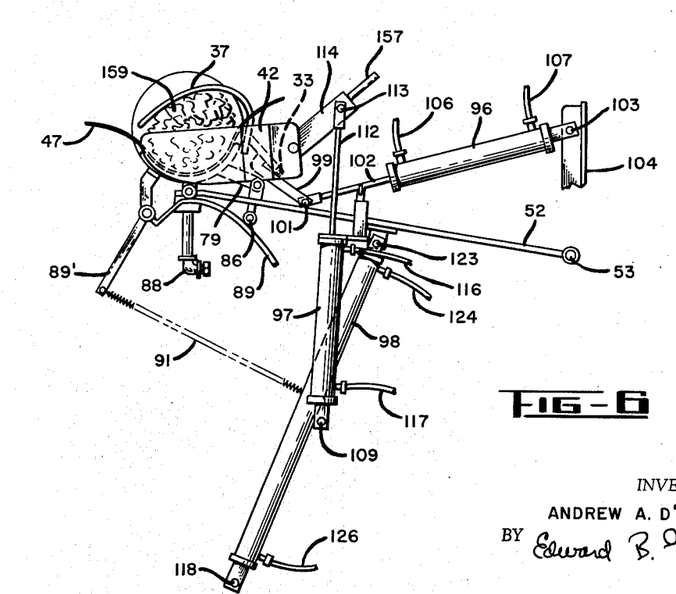
FIGURE 6 is a simplified fragmentary cross sectional view taken substantially on line 6—6 of FIGURE 2, but showing the machine in a vegetable clamp and trim condition.

The arm 52 in addition to carrying the vacuum head 51 also carries the tie delivery section 30, of the trough. As seen in FIGURES 1, 4 and 6, the tie delivery section 30 is provided with an arm 79 fixed thereto and extending from the back or bottom thereof, which arm is pivotally connected by pin 81 to the pick-up arm 52 through a bracket 82 secured to the arm. The tie delivery section 30, as seen in FIGURE 2, is provided with an aperture or a cut-out portion 83 through which the vacuum head 51 extends in the raised position of the arm 52. In the lowered position of the pick-up arm 52 the face of the vacuum head or nozzle 51 is substantially flush with the inner trough surface.

It will be seen that in the lowered position of the arm 52 the tie delivery section 30 is supported on a rest or stop member 86 attached to the machine frame, which supports said tie delivery section in substantial alignment with the members 28 and 28' of the dumping section 27 of the trough in the vegetable loading condition of the machine. As the arm is raised from the lowered position the tie delivery section 30 pivots about the pin 81 by action of gravity until the one edge 87 of the aperture 83 abuts the inlet pipe 88 to the nozzle to limit such pivotal movement.

It will here be noted that the sleeve 32 to which the trough dumping section 27 is attached for pivotal movement about the pin 33, is provided with first and second lever arms 89 and 89' for actuation between the vegetable loading (FIGURES 1 through 3) and dumping (FIGURE 4) positions. A tension spring 91 is included between the end of the arm 89' and a suitable anchor point, such as an air cylinder 97, for resiliently biasing the trough dumping section 27 in a counter-clockwise direction into the vegetable dumping position seen in FIGURE 4. The dumping section 27 is returned to the normal vegetable loading position by actuation of the lever arm 89 in a clockwise direction as viewed in FIG- URES 1 and 4. The pick-up arm 52 is provided with a roller 93 adapted to engage the lever arm 89 for rotation thereof in the clockwise direction as the arm 52 returns in a counter-clockwise direction to thereby return the dumping section 27 to the normal vegetable loading position.

The gripper member 37, knife 42 and pick-up arm 52 are positively power operated by individual fluid cylinders 96, 97 and 98, respectively. (It will here be understood that although an air pressure sytsem is preferably used, a hydraulic system may be employed, if desired, and the term "fluid" is intended to include either type.) The linkage for the gripper member includes an arm 99 which is fixed to and extends from the gripper member and interconnects through a pin 101 to the piston rod 102 of the gripper fluid cylinder 96. The fluid cylinder 96 is pivotally mounted on a pin 103 carried on a bracket 104 extending upwardly from the frame member 16a, and a piston, not shown, is slidably mounted in the cylinder 96 and connected to the piston rod 102. Flexible hoses or tubes 106 and 107 at opposite ends of the cylinder 96 connect the same to a suitable source of fluid pressure through a valve arrangement shown in the schematic diagram of FIGURE 5 and described hereinbelow. For present purposes of description it will be sufficient to note that when fluid pressure is applied to one end of the cylinder 96 through hose 106 while the other end of the cylinder is vented to the atmosphere, the piston rod 102 is retracted into the cylinder thereby rotating the gripper member 37 counter-clockwise into vegetable gripping position as illustrated in FIGURE 6. The gripper member is rotated back to its retracted position when the fluid pressure is applied to the other end of the cylinder through the hose 107 to drive the piston rod outwardly from the cylinder.

The cutter knife 42 is actuated simultaneously with the gripper member 37 by means of a fluid cylinder 97; both cylinders 96 and 97 for the gripper and knife members being under control of a foot actuated valve 108 conveniently located on the floor adjacent the machine. The fluid cylinder 97 is pivotally mounted upon a pin 109 carried on a bracket 111 extending from the upright frame member 19. The piston rod 112 for the cylinder 97 is pivotally connected by a pin 113 to a lever arm 114 extending from the knife. Hoses 116 and 117 at opposite ends of the fluid cylinder 97 are connected to a source of fluid pressure through the foot operated valve 108. When fluid pressure is applied to one end of the cylinder through the hose 116 the piston rod is retracted into the cylinder thereby rotating the knife 42 clockwise into its raised position shown in FIGURES 1 and 3. When fluid pressure is applied to the other end of the cylinder through the hose 117 the piston rod is extended and the knife is rotated into cutting position illustrated in FIGURE 6.

The fluid cylinder 98 for the pick-up head support arm 52 is pivotally connected by a pivot pin 118 to a bracket 119 carried on a frame member 121 which extends between the side frame member 17 and the brace 18. The piston rod 122 (FIGURE 4) is pivotally connected by a pin 123 to the arm 52, and flexible hoses 124 and 126 at opposite ends of the fluid cylinder are connected to the source of fluid pressure through a novel valve and valve actuator arrangement described in detail hereinbelow with reference to FIGURE 5. With fluid pressure applied to one end of the cylinder through the hose 125, the piston rod 122 is retracted and the arm 52 rotated to its counter-clockwise-most position, shown in FIGURES 1 through 3 and 6. Similarly, with fluid pressure applied to the house 126 at the other end of the cylinder, the piston rod 122 is extended and the arm 52 rotated into the tie pick-up position illustrated in FIGURE 4.

Figure 5:
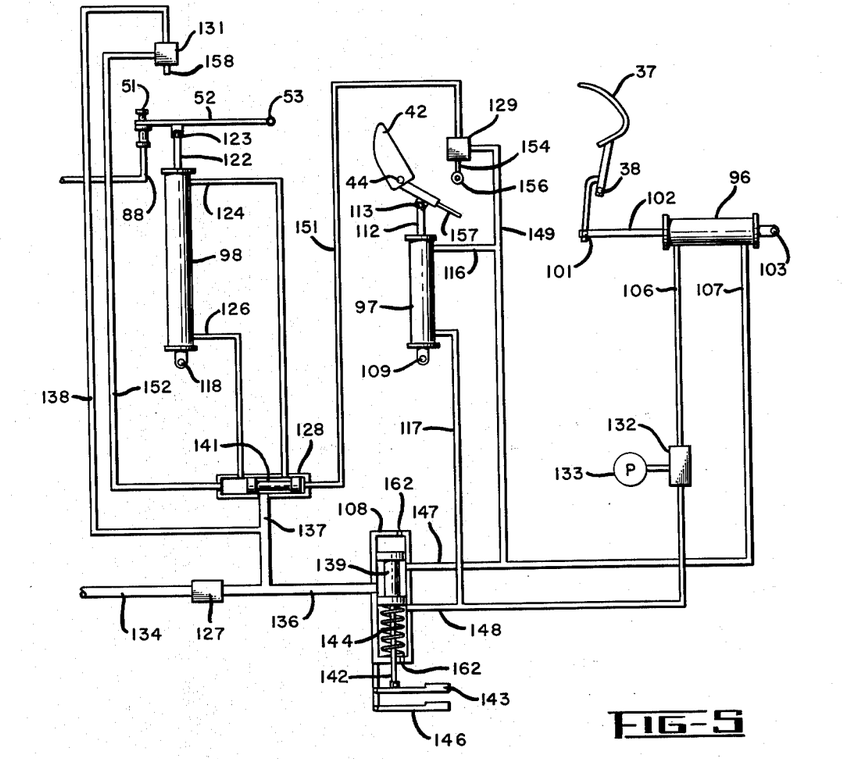
FIGURE 5 is a schematic diagram of the air system for the machine.

Reference is now made to FIGURE 5 of the drawings wherein there is shown a schematic diagram of the fluid pressure system for actuation of the fluid cylinders 96, 97 and 98. In addition to the foot operated valve 108 the system includes a main shut-off valve 127, a fluid operated valve 128, a pair of normally closed mechanically operated valves 129 and 131, and pressure regulating valve 132 which includes a handle 133 for control of the pressure in the line 106. A suitable source of fluid pressure, such as an air compressor is connected to the main shut-off valve 127 through a line 134. From the valve 127 the fluid pressure is connected through lines 136, 137, and 138 to the inlet of the foot controlled valve 108, the fluid operated valve 128 and the mechanically actuated valve 131, respectively. Both the valves 108 and 128 are shown as two-position spool type valves wherein the spools are adapted to be positioned at either end of the cylinders; the spools being designated 139 and 141, respectively. The spool 139 is connected through a rod 142 to an actuating lever 143, and is normally resiliently biased to the position illustrated in FIGURE 5 by the spring 144. When the lever 143 is pushed down it preferably locks in the down position by means not shown. A release lever 146 is included for unlocking the lever 143 and permitting the same to return to the illustrated position when said release lever 146 is actuated. Such valves are well known and commercially available, and no further details are believed to be required for an explanation of the system.

Two outlet lines 147 and 148 lead from the foot actuated valve 108; the one line 147 connecting with the line 107 to the cylinder 96, the line 116 to the cylinder 97, and a line 149 to the inlet of the on-off valve 129. The outlet line 151 from the valve 129 leads to a control inlet at one end of the valve 128 for control actuation thereof in one direction.

The other outlet line 148 from the foot actuated valve 108 communicates through the lines 106 and 117 with the cylinders 96 and 97, respectively. The pressure regulating valve 132 is included in the line 106 to the gripper arm cylinder 96 for regulation of the clamping pressure of the gripper arm 37 on the bunched vegetables, the gripping pressure being controlled by manual actuation of the control knob 133 for the pressure regulator valve.

The line 138 from the main control valve 127 is connected to the inlet of the on-off valve 131, and an outlet line 152 from the valve 131 leads to a control inlet at the other end of the valve 128 for control actuation of the spool 141 in the other direction. As mentioned above, the inlet to the valve 128 is connected through the line 137 and the main cut-off valve 127 to the pressure supply source. The two outlets from the valve 128 are connected through the lines 124 and 126 to opposite ends of the fluid cylinder 98.

It will here be understood that the on-off valves 129 and 131 are of the type such that when the valve is in the off condition, the inlet line to the valve is cut-off and the outlet line from the valve is vented to the atmosphere. With the valve in the open condition communication between the valve inlet and outlet lines is effected. Such valves are well known and need not be shown in detail. By using such valves, it will be seen that one control line to the valve 128 is vented to atmosphere when pressure is applied to the other control line thereto, whereby the spool 141 may be actuated to either end position by application of fluid pressure at the opposite end thereof.

Before describing the operation of the machine the valve actuating mechanism for the said normally closed valves 129 and 131 will first be described. The valve 129, as seen in FIGURES 1 through 4, is mounted on a bracket 153 secured to the upper end of the knife actuating piston 97. A pivotal actuating arm 154, as seen in FIGURE 2, extends from the valve 129 which arm is provided with a roller 156 for contact with a valve operating tab or extension 157 extending from a moving element on the knife 42 or the gripper 41. As shown, the extension 157 is carried on the lever arm 114 and is adapted to contact the roller 156 for actuation of the valve 129 to an open position. The arrangement is such that the valve 129 is momentarily opened both during the cutting stroke of the knife and during the return stroke thereof, adjacent the retracted or raised portion of the knife stroke. The valve 131 as seen in FIGURES 1 through 4 is secured to an inclined brace 155 attached to the side member 16a and includes an actuating rod 158 adapted for engagement by the pick-up arm 52 when the said arm is in the raised position as illustrated in FIGURE 4. Thus, each time the pick-up head support arm 52 is raised to remove a tie from the magazine the valve 131 is momentarily actuated to an open position.

The operation for bunching and trimming vegetable stalks, shoots or the like will now be described starting with the machine in the normal, or vegetable loading condition illustrated in FIGURE 1. In such condition the various valves are in their normal positions illustrated in FIGURE 5. Under such conditions the gripping member cylinder 96 is energized to extend the piston rod from the cylinder to raise the gripper member into the illustrated unclamped condition. The piston actuator 97 is energized through line 116 to withdraw the piston rod into the cylinder thereby raising the knife 42 to the position illustrated in FIGURE 1. Also the piston actuator 98 is energized through the line 124 to withdraw the piston rod into the cylinder to maintain the pick-up head support arm 52 at one end of its stroke and the attached pick-up head 51 at the utilization station. Also the valves 129 and 131 are in the normally closed condition. It will be noted that a tie 47 is located in the trough 26 and extends thereacross, the tie having been removed from the magazine 48 during the preceeding cycle of the operation. The stalks of broccoli 159 (shown in FIGURES 4 and 6) or other vegetables to be bunched and tied are placed within the trough 26 with the tip or head ends facing rearwardly and butting against the face plate 34. As mentioned above, by butting the stalks against the face plate they may be trimmed at a uniform length for production of uniform sized bunched and trimmed packs. The operator preferably stands at the rear of the machine with the foot actuated valve 108 at a convenient location thereat.

With the vegetable stalks in place on the machine, the operator first actuates the valve 108 to provide communication between the inlet pressure line 136 and the line 148. The gripper member piston actuator 96 is thereby energized through line 106 to retract the piston rod 102, and the knife cylinder 97 is simultaneously energized through the line 117 to extend the piston rod 112, whereupon the vegetable stalks are simultaneously gripped by gripper member 37 and trimmed by the knife 42, as viewed in FIGURE 6. The trimmed ends 160 of the broccoli fall into a sheet metal end trimming chute 161, shown only in FIGURES 2 and 3. With the valve 108 locked in the actuated position by the locking lever 146, the operator twists the wire ends of the tie 47 together to secure the trimmed and bunched stalks. The operator then presses the locking lever 146 with his foot to release the value actuating lever 143 allowing the valve 108 to return to the normal position illustrated in FIGURE 5. The gripper member and knife actuating cylinders 96 and 97 are thereby again pressurized through the lines 107 and 116 to return the gripper member 37 and knife 42 to their normal retracted positions illustrated in FIGURE 1.

When the knife piston actuator cylinder 97 is energized through line 117 for the above described trimming operation, the valve 129 is momentarily opened by contact of the valve operating extension lever 157 on the knife lever 114 with the roller 156 on the valve actuating arm 154. It will be noted, however, that during such trimming actuation of the knife the line 149 is unpressurized, the line 149 being connected through line 147 and the valve 108 to atmospheric pressure through one of the vents 162 in the valve 108. Thus, even through the valve 129 is momentarily opened during the cutting or trimming operating, no fluid pressure is applied therethrough to the line 151. However when the foot operated valve 108 is returned to the normal position illustrated in FIGURE 5 (after the operator finishes twisting the tie ends together to bunch the vegetable stalks) the line 149 is pressurized through the valve 108. Therefore, as the knife 43 is returned to its normal position, the valve 129 is again momentarily opened by contact of the tab 157 with the roller 156 on the actuating arm whereupon a pressure pulse is transmitted through the valve 129 and line 151 to the valve 128 to move the spool 141 from the illustrated operating position to the opposite end of the valve cylinder. Pressure from the line 137 at the inlet of the valve 128 is thereby transmitted therethrough to the line 126 to pressurize the pick-up arm cylinder actuator 98 in a manner to extend its piston rod thereby rotating the pick-up head support arm 52 upwardly. As the arm 52 rises from the position illustrated in FIGURE 1 the spring 91 rotates the trough dumping section 27 to the vegetable dumping position illustrated in FIGURE 4. The bunched articles are removed from the holding means by the release of the gripping member and tilting the dumping section of the trough thereby permitting the bunch to drop by action of gravity. Simultaneously, as the arm 52 rotates upwardly, the trough tie delivery section 30 pivots counter-clockwise about the pivot pin 81, and the said section is withdrawn from beneath the vegetable stalks without interference with the above described vegetable dumping action. The tied and trimmed vegetable bunch drops into a chute 163 (shown only in FIGURES 1, 2 and 4) which carries the same to a convenient location to the left of the machine.

After the dumping operation, the arm 52 continues to rotate upwardly in a clockwise direction by action of the fluid cylinder 98 thereon until the vacuum head 51 contacts the lowermost tie 47 in the magazine 48, firmly gripping the same. At this point in the upward pick-up stroke of the arm 52, the arm contacts the actuating rod 158 to open the valve 131. When the valve 131 opens, the line 152 is pressurized and the spool 141 of the air operated valve 128 is returned to the position illustrated in FIGURE 5. As a result, fluid pressure is again applied to the opposite end of the cylinder 98 through the line 124 to return the piston actuator to its normal position. The arm 52 is thereby rotated back in a counter-clockwise direction as viewed in FIGURE 4 under power of the piston actuator 98, and a tie is removed from the bottom of the magazine by the vacuum head 51 at the end of the arm. As the arm 52 nears the end of its return stroke the arm engages the trough actuating lever 89 to pivot the trough dumping section 27 to the normal position shown in FIGURES 1 through 3. At the same time the tie delivery section 30 of the trough contacts the rest or stop member 86 and is pivoted into the position shown in FIGURES 1 through 3. The tie 47 carried by the pick-up head 51 is thereby drawn into the tie delivery section 30 to extend thereacross, as seen in FIGURE 1, whereupon the machine is in condition for placement of another bunch of vegetables in the trough, for the start of another cycle of operation as described above.

When bunching vegetables of different grade or when bunching vegetables for different customers it is often required that ties with different wrappers or labels be applied to the bunches to distinguish therebetween. To change labels or ties with the apparatus of FIGURES 1 to 7, it is necessary to remove the supply of labels from the magazine 48 and replace them with ties having the desired labels. In a modified form of this invention, shown in FIGURES 8 to 11, a magazine construction is provided which holds a plurality of stacks of ties which stacks may contain ties with different labels or wrappers. The magazine is movable, under control of the operator, such that the ties may be withdrawn from the stack desired. With this arrangement ties with the required label may be applied to the vegetable bunches simply and easily.

Figure 8:
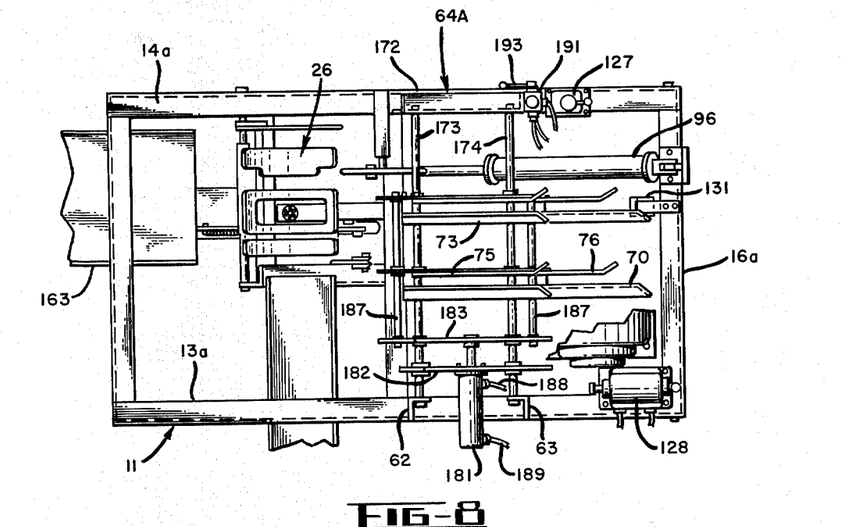
FIGURE 8 is a top plan view of a vegetable bunching and trimming machine having a modified movable magazine construction for the support of a plurality of stacks of bands or ties.
Figure 9:
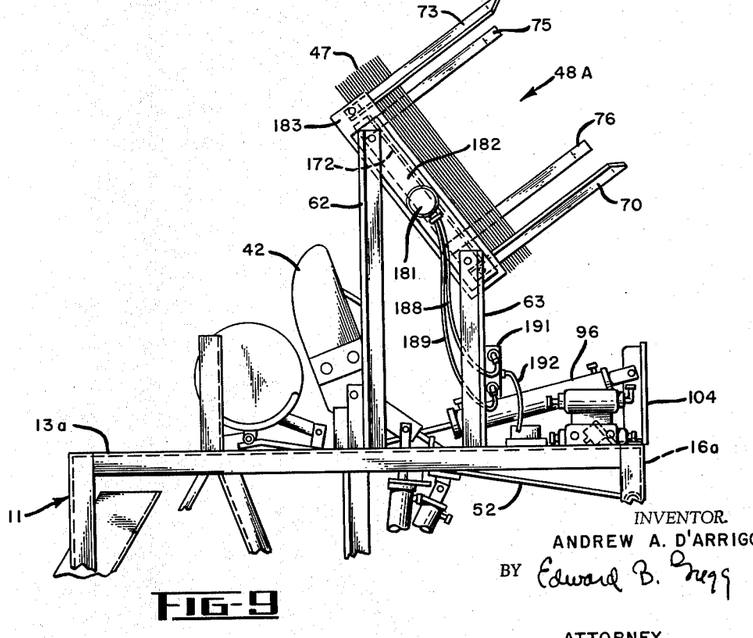
FIGURE 9 is a fragmentary front elevational view of the modified machine shown in FIGURE 8.
Figure 10:
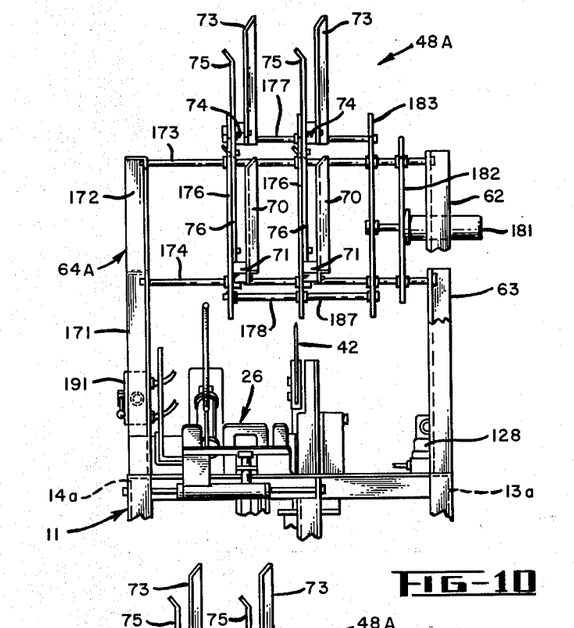
FIGURES 10 and 11 are fragmentary end elevational views of the machine shown in FIGURE 8 and showing the movable magazine for the ties in different positions.

Referring to FIGURES 8 to 10 the modified magazine construction is identified by the reference numeral 48A and is shown supported on three leg members 62, 63 and 64A. The legs 62 and 63 extend vertically upwardly from the frame member 13a and the leg 64A extends upwardly from the frame member 14a. The leg 64A has a vertical section 171 which extends upwardly approximately the same height as the leg 63, and an inclined section 172 which extends upwardly and to the left as viewed in FIGURE 9. Supporting rods 173 and 174 extend between the leg 64A and the legs 62 and 63, respectively, for the slidable support of the magazine structure 48A therealong.

In the illustrated arrangement the magazine supports two stacks of ties 47. The two tie stack supporting means are similar to the support shown in FIGURES 1 to 4 with each comprising a base member 70, an upper guide member 73 and side guides 75 and 76. The side guide members 75 and 76 are secured directly to mounting brackets 176, while the base member 70 and upper guide member 73 are secured to the brackets 176 through blocks 71 and 74, respectively.

Figure 11:
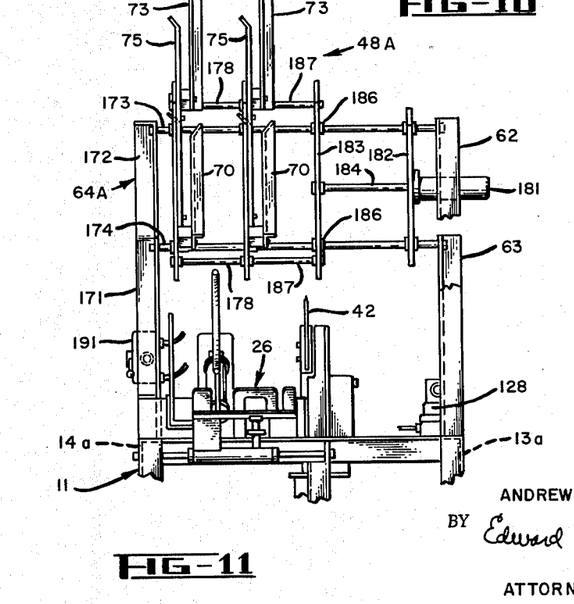

The brackets 176 are secured together by tie rods 177 and 178 which maintain the brackets a parallel spaced distance apart. Also, sleeve bearings 179 are fixed to the brackets 176 and slide along the rods 173 and 174. It will be seen, therefore, that the two tie stack supporting structures, or magazines, are secured together a fixed spaced distance apart, and are simultaneously movable along the rods 173 and 174. In the illustrated embodiment, the magazine structure is movable between two end positions. In the one position illustrated in FIGURE 10, the structure is moved to the right whereby the vacuum head 51 removes ties from the stack carried by the magazine at the left. In FIGURE 11 the structure is shown moved to the left for removal of ties from the right-hand magazine. It will be apparent that labels from one stack or the other may be selected by simply moving the structure along the rods, and that if ties with different labels or wrappers are stacked in each magazine the different labels may be applied to the bunches by moving the structure into the desired position. The remainder of the machine and its operation is the same as shown in FIGURES 1 to 7 and described above, and no further showing or explanation of the machine is believed necessary.

In the illustrated embodiment of the invention the positioning of the magazine structure is under control of a fluid cylinder 181 mounted on a bracket 182 fixed to the rods 173 and 174. An arm 183 is fixed to the end of the piston rod 184 which arm is slidably mounted along the rods 173 and 174 on sleeve bearings 186. A pair of connecting links 187 connect the arm 183 to the brackets 176 of the movable magazine structure. Flexible hoses or tubes 188 and 189 (FIGURE 9) at opposite ends of the cylinder 181 connect the same to a valve 191 which valve is connected to the main shut-off valve through a hose 192. When the valve operating handle 193 is in one end position, the inlet line 192 is connected to one of the output lines while the other output line is vented to the atmosphere. In the other end position of the handle 193 the inlet line 192 is connected to the other output line and the one output line is vented to the atmosphere. With fluid pressure applied to one end of the cylinder 181 through the hose 188, the piston rod 184 is retracted and the magazine structure moved to the right as shown in FIGURE 10, and when fluid pressure is applied to the hose 189 at the other end of the cylinder, the piston rod 184 is extended to move the magazine structure to the left as shown in FIGURE 11. The operator, by manual operation of the valve operating lever 193, is thereby able to control from which stack of ties the vacuum head 51 will withdraw ties during operation of the machine. It will be apparent that with minor modifications the magazine structure may be made to carry more than two stacks of ties, and means may be provided for locating the structure along the rods 173 and 174 for selection of ties from the desired stack.

The invention having been described in detail in accordance with the requirements of the patent statutes various other changes and modifications will suggest themselves to those skilled in this art. For example, although the valve 129 is shown actuated by movement of the knife 42, it will be apparent that since the knife 42, and gripper member 37 are actuated substantially simultaneously by the cylinders 97 and 96, respectively, the valve 129 could be mounted at a suitable location for actuation by the gripper member instead of the knife. The operating cycle of the machine would not be altered except for the actuating means for the valve 129. Such an alternative arrangement would be of particular use where no trimming of the articles is required. In such case, the knife and knife actuating means could be eliminated from the structure, and the machine would be useful in bunching and tying the articles without trimming them.

Further, although the machine has been described as used on vegetables, it is not so limited. Obviously, other generally elongated articles may be handled if desired. It is intended that the above and other such changes and modifications shall fall within the spirit and scope of the invention as recited in the following claims:

I claim:
1. A machine for use in bunching and trimming articles and banding the same together with bands comprising; a supporting frame, article holding means on said frame for gripping articles loaded thereon in a bunch, a first fluid cylinder operatively connected to the article holding means for actuating the same between article clamped and unclamped conditions, a knife mounted on the frame, a second fluid cylinder operatively connected to the knife for actuating the same between article trimming and normal retracted positions, a magazine on the frame for holding a supply of bands, a pick-up head movable between the magazine and said article holding means to transfer a band from the magazine to the article holding means for use in tying the articles together in a bunch, a third fluid cylinder operatively connected to the pick-up head for moving the same between the magazine and article holding means, means under control of an operator for energizing the first and second fluid cylinders for actuation of the article holding means into clamping position and actuation of the knife into the trimming position, respectively, means under control of the operator for energizing the first and second fluid cylinders in the opposite direction for return of the article holding means and knife to their normal unclamped and retracted positions, respectively, and means energizing the third fluid cylinder for moving the pick-up head from the article holding means to the magazine and back again for removal of a tie from said magazine and the placement thereof in the article holding means in preparation of loading the same with articles for another cycle of operation.

2. The machine defined by claim 1 wherein the last-named means is actuated in response to return movement of said knife from its article trimming position to retracted position.

3. The machine defined by claim 1 wherein the magazine includes means for supporting at least two spaced apart stacks of bands, and means for moving the magazine for removal of bands by said pick-up head from either of said stacks.

4. The machine defined by claim 1 wherein the article holding means comprises a trough including a dumping section movable between normal article supporting position and an article dumping position, a gripper member movable between a normal open position and article clamping position, the dumping trough section and gripper member embracing the articles on the dumping trough section in the article supporting position of the dumping trough section and clamping position of the gripper member, the said first cylinder being operatively connected to the gripper member for actuation thereof, means resiliently biasing the dumping trough section to the article dumping position, and means under control of the third fluid cylinder for driving the dumping trough section into the article supporting position against the resilient biasing means when the pick-up head is adjacent thereto.

5. The machine defined by claim 4 wherein the pick-up head comprises a vacuum nozzle with a vacuum source connected thereto, and the said bands are of the skirt-type which include a wrapper portion adapted for suction engagement by the vacuum nozzle.

6. A machine for use in bunching generally elongated articles and tying the same together with ties comprising; a supporting frame, article holding means on said frame for gripping articles in a bunch, a magazine on the frame for containing a supply of ties, a movable tie pick-up head operable to grip a tie, and means moving the pick-up head between the magazine to the article holding means to transfer a tie from the magazine to the article holding means for use in tying the gripped articles together in a bunch.

7. The machine defined by claim 6 including means operable to remove a bunch of articles from said article holding means, and means under the control of said pick-up head moving means for operating said article removing means when said pick-up head is moved from said article holding means to said magazine.

8. The machine defined in claim 6 wherein the magazine includes means for supporting at least two stacks of ties, and said magazine is movable along said frame for removal of a tie by said pick-up head from either stack thereof.

9. The machine defined by claim 6 wherein the article holding means comprises a trough including a dumping section pivotally mounted on the frame and movable between a normal article supporting position and an article dumping position, and a gripper member pivotally mounted on the frame for embracing the articles on the trough, the machine also comprising means resiliently biasing the dumping section to the article dumping position, and means under control of the said means moving the pick-up head for pivoting the dumping section into the article supporting position when the pick-up head is adjacent the dumping section.

10. The machine defined by claim 9 wherein the means moving the pick-up head includes a pivotally mounted pick-up head support arm, the trough also including a tie delivery section pivotally mounted on the pick-up head support arm and having a cut-out portion therein through which the pick-up head is adapted to extend, the dumping and tie delivery sections of the trough being of an arcuate shape with article supporting surfaces lying in a continuous concave surface in the normal article supporting position thereof.

11. A machine for use in bunching articles and banding the same together with bands comprising; a supporting frame, article holding means on said frame for gripping articles in a bunch, a magazine on the frame for holding a supply of bands, a vacuum head support arm pivotally mounted on the frame, a vacuum head carried on the support arm, a vacuum source connected to the vacuum head, means moving said vacuum head by the support arm between the magazine and the article holding means to transfer bands from the magazine to the said article holding means for use in banding the gripped articles together in a bunch, the band being held by the vacuum head at the article holding means when the machine is being loaded with articles and when the articles are bunched together by the article holding means.

12. The machine defined by claim 11 including means operable to remove a bunch of articles from said article holding means, and means under the control of said vacuum head moving means for operating said article removing means when said vacuum head is moved from said article holding means to said magazine.

13. The machine defined by claim 11 including a knife for trimming the ends of the articles in the article holding means, means pivotally mounting the knife on the said frame, and means substantially simultaneously actuating the knife and article holding means to hold the articles in a bunch and trim the ends thereof.

14. A machine for use in bunching and banding articles together comprising a supporting frame, a trough comprising a dumping section having an arcuate shaped article supporting surface for the support of articles loaded thereon, means movably mounting the dumping section of the trough on the frame for movement between a normal article supporting position and an article dumping position; a gripper member movably mounted on the frame and movable between open and article clamping positions for embracing articles loaded onto the trough, a magazine on the frame for holding a supply of bands, a pick-up head operable to grip a band and movable between the magazine and normal position adjacent the dumping section of the trough, means under control of an operator for actuating the gripper member into article clamping position during which time the operator may band together the articles on the trough, means under control of the operator for returning the gripper member to its open position, means operable upon the return stroke of the gripper member for moving the pick-up head through a complete cycle of operation from its normal position at the dumping section to the magazine and back again for removal of a band from the magazine by said pick-up head and placement thereof across the trough, and means actuating the dumping section of the trough through a complete cycle of operation between article supporting and dumping positions during actuation of the pick-up head to empty the trough by dumping the banded articles therefrom in preparation of another cycle of operation.

15. The machine defined by claim 14 wherein the trough includes a tie delivery section pivotally mounted with respect to the pick-up head and having an arcuate shaped article supporting surface alignable in end-to-end relation with the article supporting surface of the dumping section, said tie delivery section having a cut-out portion through which the pick-up head is adapted to extend when the pick-up head is adjacent the magazine, the band gripped by the pick-up head extending across the tie delivery section of the trough when the pick-up head is returned to its normal position.

References Cited by the Examiner

UNITED STATES PATENTS

| | | | |
|---|---|---|---|
| 2,262,991 | 11/1941 | D'Arrigo | 146—82 |
| 2,682,288 | 6/1954 | Magnuson et al. | 100—6 |
| 2,859,570 | 11/1958 | Burnett | 53—32 X |

FOREIGN PATENTS 637,023 5/1950 Great Britain.

WALTER A. SCHEEL, *Primary Examiner.*